United States Patent
Buchner

(10) Patent No.: US 10,591,213 B2
(45) Date of Patent: Mar. 17, 2020

(54) DRYER CONTROL SYSTEMS AND METHODS

(71) Applicant: ENVIROSTAR, LLC, Sauk Rapids, MN (US)

(72) Inventor: Clinton Buchner, Sauk Rapids, MN (US)

(73) Assignee: ENVIROSTAR, LLC, Sauk Rapids, MN (US)

( * ) Notice: Subject to any disclaimer, the term of this patent is extended or adjusted under 35 U.S.C. 154(b) by 0 days.

(21) Appl. No.: 16/064,910

(22) PCT Filed: Jan. 16, 2018

(86) PCT No.: PCT/US2018/013840
§ 371 (c)(1),
(2) Date: Jun. 21, 2018

(87) PCT Pub. No.: WO2018/132822
PCT Pub. Date: Jul. 19, 2018

(65) Prior Publication Data
US 2019/0113279 A1    Apr. 18, 2019

Related U.S. Application Data

(60) Provisional application No. 62/446,696, filed on Jan. 16, 2017.

(51) Int. Cl.
*F26B 21/06*    (2006.01)
*F26B 21/08*    (2006.01)
(Continued)

(52) U.S. Cl.
CPC ............ *F26B 21/06* (2013.01); *B01D 1/18* (2013.01); *F26B 3/12* (2013.01); *F26B 21/08* (2013.01); *F26B 21/10* (2013.01); *F26B 21/12* (2013.01)

(58) Field of Classification Search
CPC ............ F26B 3/00–26; F26B 21/06–12; B01D 1/16–20
See application file for complete search history.

(56) References Cited

U.S. PATENT DOCUMENTS 3,905,123 A    9/1975 Fowler et al.
4,052,255 A    10/1977 Hackbarth et al.
(Continued)

FOREIGN PATENT DOCUMENTS

EP    0479204 A1    4/1992
EP    0789209 A2    8/1997
EP    1195191 A1    4/2002

OTHER PUBLICATIONS

International Search Report and Written Opinion for International Application No. PCT/US2018/013840, dated May 23, 2018.

*Primary Examiner* — Renee Robinson
(74) *Attorney, Agent, or Firm* — Patterson Thuente Pedersen, P.A.

(57) ABSTRACT

Systems and methods for drying system control. A control system receives inputs and measurements and provides modulated outputs to a drying system, control subsystems, or a user interface. An energy ratio compares the optimal energy required to the actual energy applied is into the control system for a drying process and can be provided as a constraint for optimization. The energy ratio enables compensation for effects that environmental variables such as ambient humidity and temperature may have on system performance. The control system can modulate the energy supplied by the drying system to meet an energy ratio setpoint. Embodiments of the present disclosure can validate the effectiveness of the control system by monitoring material yield and utility consumption in real-time to optimize system performance.

19 Claims, 6 Drawing Sheets

(51) Int. Cl.
    *F26B 21/10*     (2006.01)
    *F26B 21/12*     (2006.01)
    *F26B 3/12*     (2006.01)
    *B01D 1/18*     (2006.01)

(56) References Cited

U.S. PATENT DOCUMENTS

| | | | |
|---|---|---|---|
| 4,149,844 A * | 4/1979 | Noyes | F26B 17/122 |
| | | | 34/174 |
| 4,233,114 A | 11/1980 | Gastaldi | |
| 4,487,577 A * | 12/1984 | Watson | F27D 19/00 |
| | | | 34/536 |
| 6,256,902 B1 | 7/2001 | Flaherty et al. | |
| 7,469,488 B2 | 12/2008 | Chen et al. | |
| 7,475,556 B2 | 1/2009 | Arno | |
| 8,402,672 B2 | 3/2013 | Nielsen | |
| 8,590,801 B2 | 11/2013 | Moran et al. | |
| 9,084,976 B2 | 7/2015 | Dobry et al. | |
| 9,848,628 B1 * | 12/2017 | Strahm | F26B 23/10 |
| 2005/0050759 A1 | 3/2005 | Chandran et al. | |
| 2006/0039987 A1 | 2/2006 | Batycky et al. | |
| 2010/0005683 A1 | 1/2010 | Nielsen | |

* cited by examiner

DRYER CONTROL SYSTEMS AND METHODS

CROSS-REFERENCE TO RELATED APPLICATION

The present application claims the benefit of U.S. Provisional Application No. 62/446,696 filed Jan. 16, 2017, which is incorporated by reference in its entirety herein.

TECHNICAL FIELD

The present disclosure relates generally to control systems, especially those adapted for controlling drying processes to remove moisture from input material.

BACKGROUND

Many industrial processes require a drying step to remove water moisture or other solvents from a slurry. Such industrial processes require the balancing of a number of control variables in order to achieve or optimize toward, desired results, such as attributes of the finished product, yield over time, and energy use.

Material yield is an aspect of the drying process that is important because it is not only an indication of the performance of the process but is also a factor in determining total operational cost. Similarly, utility consumption can be a significant factor in determining the performance of the process and can be an important variable in determining total operational cost. Because utilities consumed by drying processes are often derived from non-renewable resources, the need to optimize utility consumption can be heightened.

Existing control systems for drying processes are limited in the range of input variables that are considered in order to maintain a limited set of desired outputs. For example, some systems attempt to achieve or maintain a temperature setpoint on either the inlet or outlet side of the drying process by modulating either the inlet temperature or the flow rate of raw material. This method of control does not automatically adapt to environmental variables and process variations, increasing the risk of over or under saturation of drying gasses leading to less than optimum drying conditions.

Many conventional control systems are initially set-up or baselined using assumptions made based on the design of the dryer system, and in some cases a brief pilot testing period. When the initial set-up assumptions are not revisited, dryer systems, especially in environments with highly variable ambient conditions, can fail to run efficiently. This can result in reduced yields, or unnecessary energy consumption.

Control systems that adapt to ambient conditions exist, however these do not consider the efficiency of the drying process as a whole. In addition, existing methods to determine material yield often must wait for the process to complete in order to determine the total yield.

SUMMARY

Embodiments of the present disclosure include systems and methods for controlling a drying system. By integrating an energy ratio that compares a theoretical optimal energy required to the actual energy applied into the control system for a drying process, embodiments of the present disclosure can optimize performance of the system in real-time. Integration of the energy ratio enables embodiments to compensate for the effects that environmental variables such as ambient humidity and temperature have on the performance of drying systems, thus reducing the risk of over- or undersaturation of the drying gasses. This can be accomplished by adjusting the total energy supplied by the drying system to be as close as possible to the total energy required by the substrate being dried. Embodiments of the present disclosure can validate the effectiveness of the control system by monitoring material yield in real-time to ensure optimum system performance. Embodiments of the present disclosure can therefore provide optimized processing times, energy consumption, and material yields.

Embodiments include control systems and methods for an apparatus for drying a raw material to produce a finished material with a reduced moisture content (i.e., a dryer or drying system). The apparatus for drying can comprise a raw material supply, a heat source, and a plurality of sensors including at least one ambient condition sensor and at least one sensor providing an indication of the moisture content of the finished material. The apparatus for drying can be a spray dryer, a tumble dryer, a drying tunnel, an in-line dryer, a drum dryer, or the like.

In embodiments, the control system can comprise a sensor input module, a configuration interface, a calculation module, and an output interface.

In embodiments, a measurement from each sensor of the plurality of sensors, can be received, for example at the sensor input module. In embodiments, input defining a desired indication of the moisture content of the finished material, and a desired energy ratio can be received, for example at the configuration interface. The energy ratio can be defined by the ratio between the actual energy applied to the raw material and the theoretical energy required to achieve the desired indication of moisture content of the finished material.

In embodiments, an ideal raw material supply rate and an ideal amount of heat energy to apply can be calculated based on the energy ratio and the input from the at least one ambient condition sensor. In embodiments, the calculation can be performed by the calculation module. An output of the calculated ideal raw material supply rate and the calculated ideal amount of heat energy to apply can be provided for controlling the apparatus for drying. In embodiments, the output can be presented at a user interface or a programmatic interface. In embodiments, the dryer system can be directly controlled to dry the raw material using the calculated ideal raw material supply rate and the calculated ideal amount of heat energy to apply In embodiments, the ideal raw material supply rate and the ideal amount of heat energy to apply are determined by monitoring the indication of moisture content of the finished material and adjusting the raw material supply rate and amount of heat energy to apply. The raw material supply rate can be reduced if the indication of moisture content of the finished material is higher than the desired indication of moisture content of the finished material and the amount of heat energy being applied is greater than or equal to a maximum amount of heat energy to apply. The amount of heat energy to apply can be increased if the indication of moisture content of the finished material is higher than the desired indication of moisture content of the finished material and the amount of heat energy being applied is less than or equal a maximum amount of heat energy to apply.

The raw material supply rate can be increased if the indication of moisture content of the finished material is less than the desired indication of moisture content of the finished material and the raw material supply rate is greater than a maximum raw material supply rate. The amount of heat energy to apply can be decreased if the indication of moisture content of the finished material is lower than the desired indication of moisture content of the finished material and the raw material supply rate is greater than or equal to a maximum raw material supply rate. In embodiments, the ideal amount of heat energy to apply can be output as one of: a temperature setpoint or a power level for the heat source. In embodiments, the indication of moisture content of the finished material is one of: a density of the finished material, a temperature of the finished material, an exhaust air temperature, a moisture content of the finished material, or a combination thereof. In embodiments, the at least one ambient condition sensor can be at least one of: a temperature sensor and a moisture sensor.

In embodiments, the configuration interface and/or the output interface can be either a user interface or a programmatic interface. In embodiments, the output interface is operably coupled to a secondary control system or subsystem, such that the output of the calculated ideal raw material supply rate and calculated amount of heat energy are provided as setpoints to the secondary control system or subsystem.

In embodiments, the calculation of the energy ratio can include a system loss constant. In embodiments, the output interface can provide yield and energy consumption information such as an output of a calculated processing cost per unit of finished material.

The above summary is not intended to describe each illustrated embodiment or every implementation of the subject matter hereof. The figures and the detailed description that follow more particularly exemplify various embodiments.

BRIEF DESCRIPTION OF THE DRAWINGS

Subject matter hereof may be more completely understood in consideration of the following detailed description of various embodiments in connection with the accompanying figures.

Figure 1:
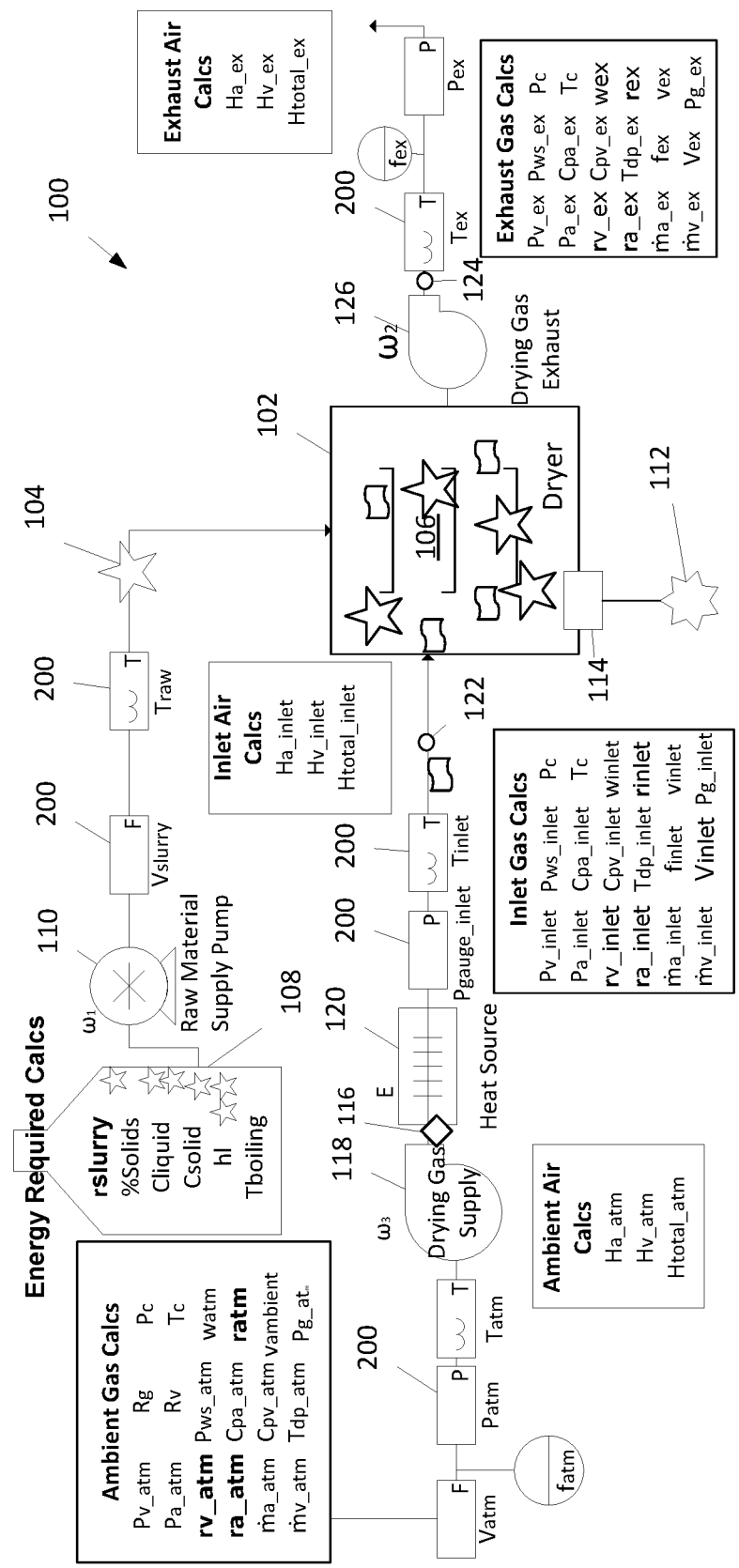
FIG. 1 is a schematic view depicting a dryer system, according to embodiments.

While various embodiments are amenable to various modifications and alternative forms, specifics thereof have been shown by way of example in the drawings and will be described in detail. It should be understood, however, that the intention is not to limit the claimed inventions to the particular embodiments described. On the contrary, the intention is to cover all modifications, equivalents, and alternatives falling within the spirit and scope of the subject matter as defined by the claims.

DETAILED DESCRIPTION OF THE DRAWINGS

FIG. 1 is a schematic view depicting a dryer system for control by embodiments of the present disclosure. The system depicted in FIG. 1, comprising a single spray dryer, is provided as an example. Those of ordinary skill in the art will recognize that embodiments of the present disclosure can be used to control drying systems and processes including a plurality of drying units of various types including, but not limited to, sheet dryers (as used for plywood or veneers), fabric dryers (as used in clothing manufacturing and commercial cleaning), and finishing dryers as used in the applications of paints and stains. Those of ordinary skill in the art will recognize that embodiments of the present disclosure are compatible with dryer systems having more, fewer, or alternative components.

In the example of FIG. 1, dryer system 100 includes spray dryer 102. Raw material 104 is pumped into chamber 106 from raw material storage 108 by raw material pump 110. Finished material 112 exits chamber 106 through outlet 114.

Supply gas 116 is pumped by air supply fan 118 into chamber 106. Supply gas 116 can be treated by components such as heat source 120 to alter properties such as temperature or humidity, before entering chamber 106 as drying gas 122. The source of supply gas 116 can be the air in the ambient in embodiments, though supply gas 116 can also be compressed air or other fluids useful for moisture removal. As discussed in this disclosure, references to the ambient or atmospheric conditions refer to the conditions of supply gas 116, regardless of source.

Exhaust gas 124 is pumped out of chamber 106 by exhaust fan 126. In embodiments, exhaust gas 124 can be pumped into the environment, back into the gas supply, or in to treatment or storage systems for reuse or modification as required by the process.

While supply gas 116, drying gas 122, and exhaust gas 124 are labeled as "gasses," in embodiments it is expected that supply gas 116 and drying gas 122 may be fluid mixtures including both liquid and gaseous components.

Typically, dryer system 100 presents a number of sensors 200 configured to provide data to manual operators or automated control systems. In embodiments, sensors 200 can provide sensed measurements as described in Table 1 below, in embodiments the measurements of Table 1 can be provided as user input. Those of ordinary skill in the art will appreciate that embodiments of the present disclosure can receive more, fewer, or alternative measurements, and that each measurement can be provided by one or more alternative sensors, or sensors and calculations.

TABLE 1

| | Measurements | | |
|---|---|---|---|
| Variable | Description | Units | Source |
| $V_{slurry}$ | Total volumetric flow of raw material into drying process | m³/min | Flowmeter |
| % Solids | Ratio of solids to liquid by weight of raw material into drying process | % | Mass Flow Meter or Offline Measurement |
| $\dot{m}_{slurry}$ | Mass flow rate of raw material into drying process | kg/min | Mass Flow Meter or Scale |
| $T_{raw}$ | Temperature of raw material into drying process | ° K. | Temperature Probe |
| $P_{atm}$ | Pressure of air prior to conditioning by drying process | Pa | Pressure Gauge |
| $\phi_{atm}$ | Relative humidity of air prior to conditioning by drying process | % | RH Sensor |
| $V_{atm}$ | Volumetric flow rate of air prior to conditioning by drying process | m³/min | Flowmeter |
| $T_{atm}$ | Temperature of air prior to conditioning by drying process | ° K. | Temperature Probe |
| $P_{gauge\_inlet}$ | Pressure of drying gas at inlet of drying chamber | Pa | Pressure Gauge |

TABLE 1-continued

Measurements

| Variable | Description | Units | Source |
|---|---|---|---|
| $T_{inlet}$ | Temperature of drying gas into drying process | °K. | Temperature Probe |
| $P_{ex}$ | Pressure of drying gas at outlet of drying chamber | Pa | Pressure Gauge |
| $\phi_{ex}$ | Relative humidity of air exhausted by drying process | % | RH Sensor |
| $T_{ex}$ | Temperature of drying gas exhausting from drying process | °K. | Temperature Probe |
| $\dot{m}_{finished}$ | Mass flow rate of finished material out of drying process | kg/min | Mass Flow Meter or Scale |

Figure 2:
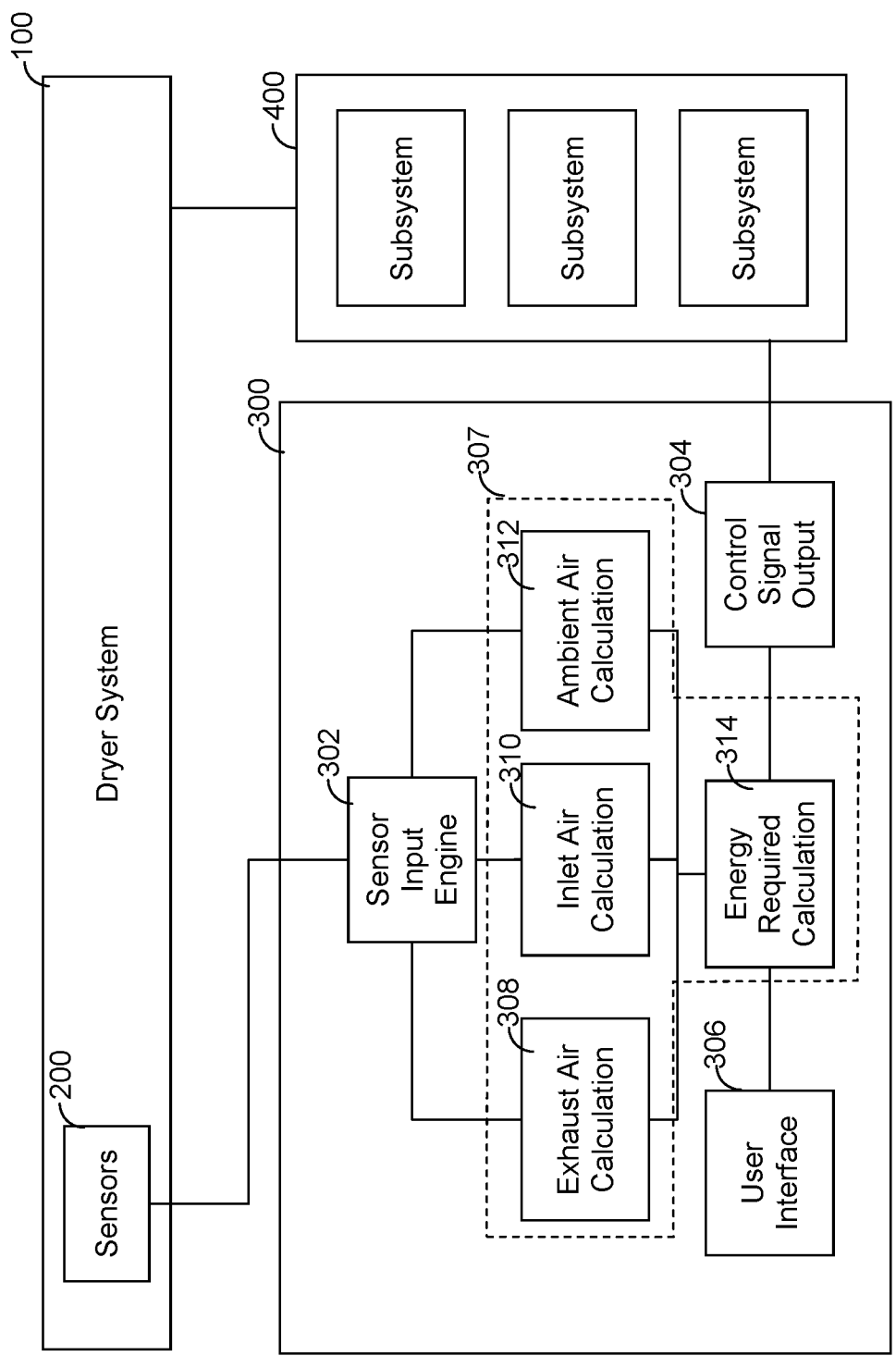
FIG. 2 is a block diagram depicting a schematic view of components of a dryer system and associated control system, according to embodiments.
Figure 3:
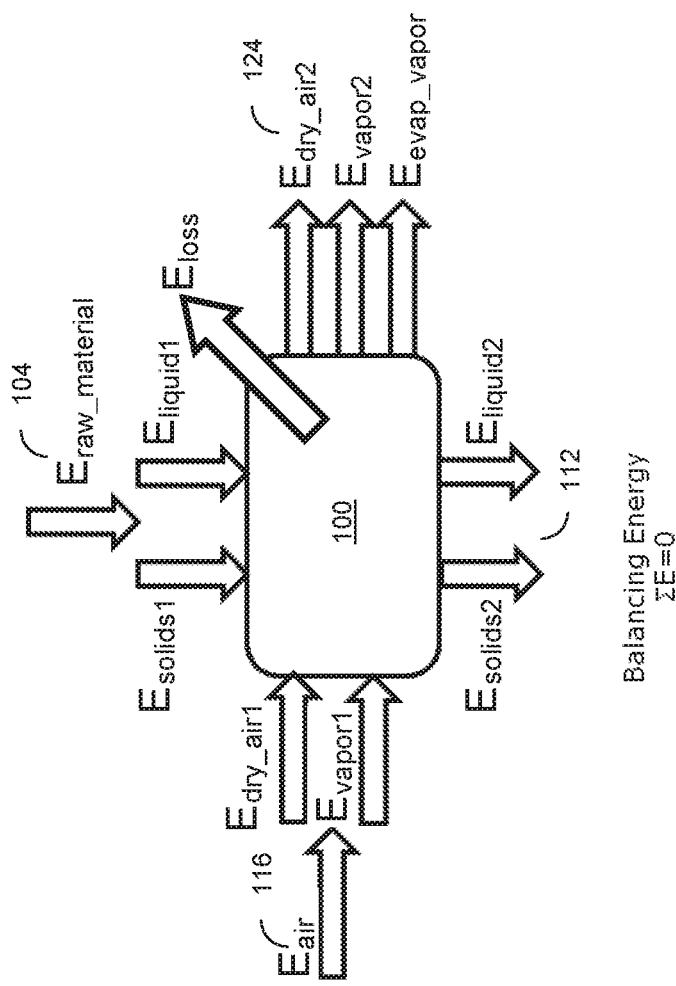
FIG. 3 is an energy balance diagram for a dryer system, according to embodiments.

FIG. 2 is a block diagram depicting components of a control system 300, according to an embodiment. Control system 300 can interface with various components of dryer system 100 to modulate their operation in order to meet desired setpoints subject to constraints. In embodiments, control system 300 can modulate raw material pump speed $w_1$ at raw material pump 110, air supply fan speed $w_2$ at air supply fan 118, exhaust fan speed $w_3$ at exhaust fan 126, and heat source output E at heat source 120. Each of modulated outputs $w_1$, $w_2$, $w_3$, and E can be set by user input, or calculated by control system 300 based on other user inputs. Each of modulated outputs $w_1$, $w_2$, $w_3$, and E can be subject to fixed, minimum value, or maximum value constraints. Those of ordinary skill in the art will appreciate that embodiments of the present disclosure can be used with dryer systems allowing more, fewer, or alternative modulated components.

In embodiments, control system 300 can be configured to interface with one or more control subsystems 400, for direct modulation of dryer system operations such as raw material pump speed, air supply fan speed, exhaust fan speed, and heat source output. As is typical in the art, control subsystems 400 can be configured to receive inputs from an operator, or a control system, such as control system 300. In embodiments, control system 300 can provide specific values for speeds and outputs, however in many environments it is desirable to modulate the setpoints and constraints used by the one or more control subsystems 400. In embodiments therefore, control system 300 can modulate setpoints for one or more sensed measurements as discussed above with regard to Table 1. For example, in embodiments, control system 300 can provide a desired raw material flow rate, $V_{slurry}$, and one or more control subsystems 400 can modulate the raw material pump speed, $w_1$ to achieve this. Similarly, in embodiments, control system 300 can provide a desired inlet air temperature, $T_{inlet}$, and one or more control subsystems 400 can modulate the heat source output, E, as required in order to achieve this. Other setpoints can be provided to control subsystems 400 as desired for embodiments, and configurations of dryer system 100.

By modulating setpoints, instead of or in addition to direct values, control system 300 can be flexibly adapted to multiple dryer systems which may include components with varied functionality. In embodiments, control system 300 can modulate a combination of setpoints and direct values as desired.

Sensor input engine 302 is configured to gather measurement data from sensors 200 provided in drying system 100. In embodiments, Sensor input engine 302 can include direct wired or wireless connections to sensors 200. In embodiments, measurement collection engine can receive measurement data via user interface 306 or programmatically. Combinations of direct connections and user interface inputs can also be used.

Control signal output engine 304 is configured to send control signals to components of drying system 100 in order to modulate operating parameters. In embodiments, control signal output engine 304 can include direct wired or wireless connections to components of drying system 100. In embodiments, control signal output engine 304 can present modulated outputs to user interface 306, for manual entry by an operator or programmatic control of dryer system 100. As depicted in FIG. 2, in embodiments, control signal output engine 304 can be configured to interface with one or more control subsystems 400 of for providing control signals to components of dryer system 100, however, in embodiments, control signal output engine 304 can interact directly with components of dryer system 100.

User interface 306 can be configured to allow entry of system constants, setpoints, constraints, and other control parameters. User interface 306 can be further configured to provide output of current system measurements, process variables, or other data. User interface 306 can be a human computer interface such as a graphical user interface or command line interface. In embodiments, user interface 306 can be a programmatic interface such as an application programming interface (API) allowing programmatic operation of control system 300 without direct operator input.

Calculation engine 307 is configured to provide calculations of process values, modulated outputs, or any other intermediate values required in order to determine signals to be output either via control signal output engine 304, or user interface 306. As depicted in FIG. 2, calculation engine 307 can comprise exhaust air calculation 308, inlet air calculation 310, ambient air calculation 312 and energy required calculation 314 sub engines subengines in embodiments. Exhaust air calculation 308 can provide an indication of the moisture content of the finished material, and other calculations can be substituted for use in monitoring finished material parameters. Similarly, inlet air calculation 310 and ambient air calculation 312 can provide an indication of the general ambient conditions. Embodiments of calculation engine 307 can include more, fewer, or other subengines as required to determine control outputs.

As can be appreciated, embodiments of control system 300 can include spreadsheets or other computer applications in which inputs are entered manually or programmatically. In embodiments, control system 300 can include dedicated hardware control modules, which can interact with available control interfaces provided by drying system 100.

The operation of calculation engine 307, according to an embodiment is further described below. In addition to the one or more measured values from sensors 200 such as those listed in Table 1 above, control system 300 can receive a number of constants based on the composition of raw material 104. In embodiments, constants received can include those listed in Table 2 below. Those of ordinary skill in the art will appreciate that embodiments of the present disclosure can receive more, fewer, or alternative constants.

TABLE 2

Constants

| Variable | Units | Description |
|---|---|---|
| $C_{(liquid)}$ | J/kg °K. | Specific heat of liquid in raw material into the drying process |

TABLE 2-continued

Constants

| Variable | Units | Description |
|---|---|---|
| $T_{boiling}$ | °K. | Boiling temperature of liquid in raw material into drying process |
| $h_l$ | J/kg | Latent heat of vaporization of liquid in raw material into drying process |
| $R_g$ | J/° K.mol | Gas constant for dry gas portion of drying air stream |
| $R_v$ | J/° K.mol | Gas constant for vapor portion of drying air stream |
| $P_c$ | Pa | Critical pressure of gas in drying air stream |
| $T_c$ | °K. | Critical temperature of gas in drying air stream |
| $C_1$ | | Saturation pressure interpolation constant |
| $C_2$ | | Saturation pressure interpolation constant |
| $C_3$ | | Saturation pressure interpolation constant |
| $C_4$ | | Saturation pressure interpolation constant |
| $C_5$ | | Saturation pressure interpolation constant |
| $C_6$ | | Saturation pressure interpolation constant |

In embodiments, calculation engine 307 can calculate process values based on measurements and constants of Tables 1 and 2 above. Process values calculated by embodiments include those listed in Table 3 below. Those of ordinary skill in the art will appreciate that embodiments of the present disclosure can receive more, fewer, or alternative process values. In embodiments, control system can 300 can receive input regarding desired values, or setpoints for any measured input or process value. As can be seen in Table 3, some process value calculations rely on assumed constants, which here are based on the assumption that any liquid components are water or water vapor. In embodiments where other liquid components are present, the formulas presented in Table 3 may be altered. In addition, those of ordinary skill in the art will appreciate that there may be a plurality of means for measuring or calculating any given process variable. The formulas provided in Table 3 are used in embodiments, while other embodiments may use alternate calculations.

TABLE 3

Process Values

Figure 5A:
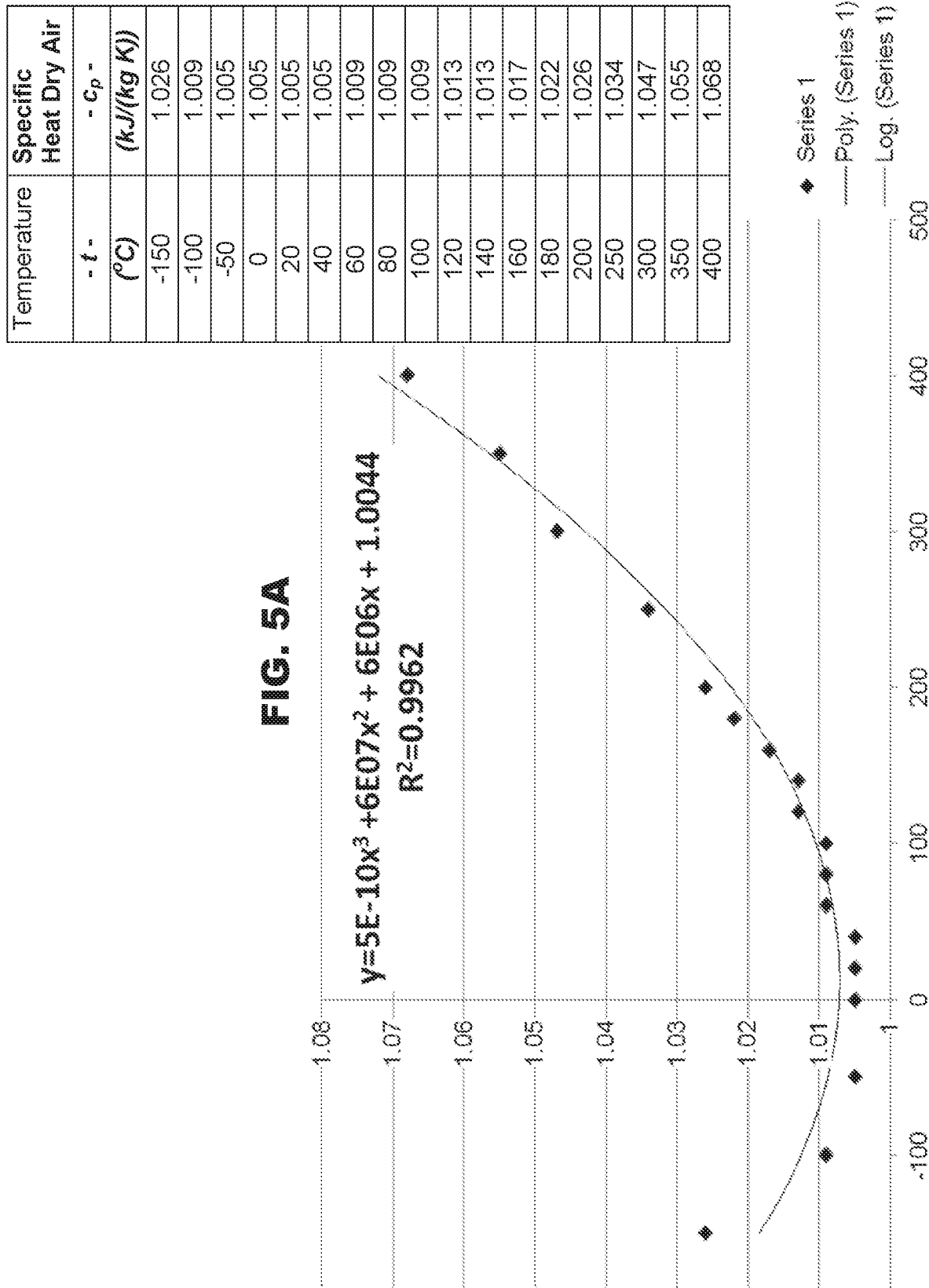
FIG. 5A is a table and graph depicting specific heat values for dry air.
Figure 5B:
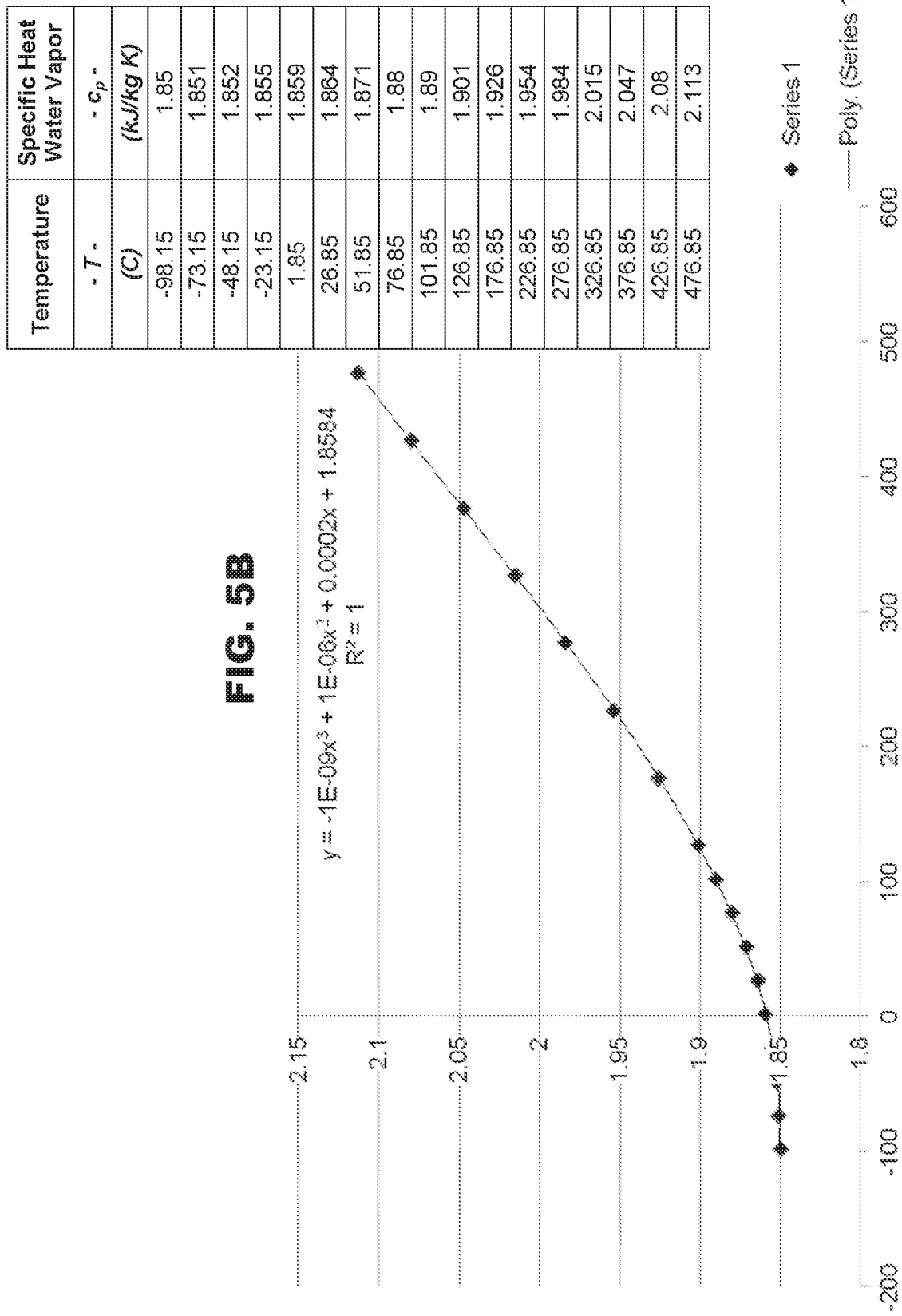
FIG. 5B is a table and graph depicting specific heat values for water vapor in air.

| Variable | Units | Description | Formula |
|---|---|---|---|
| $\rho_{slurry}$ | kg/m³ | Density of raw material into drying process | $\dot{m}_{slurry}/V_{slurry}$ |
| $\omega_{atm}$ | kg/kg | Specific humidity of gas mixture supplying drying process | $0.622 \dfrac{P_{v\_atm}}{P_{atm} - P_{v\_atm}}$ |
| $\rho_{atm}$ | kg/m³ | Density of gas mixture supplying drying process | $\rho_{a\_atm} + \rho_{v\_atm}$ |
| $V_{ambient}$ | — | Calculated value used to interpolate saturation press of gas mixture supplying drying process | $1 - \dfrac{T_{atm}}{T_c}$ |
| $P_{ws\_atm}$ | Pa | Saturation press of gas mixture supplying drying process | $100 \times P_c \times e^{\frac{T_c}{T_{atm}} \times I}$ where: $I = \dfrac{(C_1 v_{ambient} + C_2 v_{ambient}^{1.5} + C_3 v_{ambient}^3 + C_4 v_{ambient}^{3.5} + C_5 v_{ambient}^4 + C_6 v_{ambient}^{7.5})}{T_{atm} - 273}$ |
| $T_{celsius}$ | °C. | Ambient temperature in Celsius | |
| $C_{pa\_atm}$ | J/kg° K. | Specific heat of dry gas component of gas mixture supplying drying process, interpolated from specific heat table of FIG. 5A | $(T_{celsius}^3 \times (-5) \times 10^{-10} + T_{celsius}^2 \times 6 \times 10^{-7} + T_{celsius} \times 6 \times 10^{-6} + 1.0044)$ |
| $C_{pv\_atm}$ | J/kg° K. | Specific heat of vapor component of gas mixture supplying drying process, interpolated from specific heat table of FIG. 5B | $(T_{celsius}^3 \times (-1) \times 10^{-9} + T_{celsius}^2 \times 10^{-6} + T_{celsius} \times 2 \times 10^{-4} + 1.8584)$ |
| $P_{g\_atm}$ | Pa | Partial pressure of gas mixture supplying drying process | $P_{ws\_atm}$ |
| $P_{v\_atm}$ | Pa | Partial pressure of vapor component of gas mixture supplying drying process | $\phi_{atm} P_{g\_atm}$ |
| $P_{a\_atm}$ | Pa | Partial pressure of dry air component of gas mixture supplying drying process | $P_{g\_atm} - P_{v\_atm}$ |
| $\rho_{a\_atm}$ | kg/m³ | Density of dry gas component of gas mixture supplying drying process | $\dfrac{P_{a\_atm}}{R_g T_{atm}}$ |
| $\rho_{v\_atm}$ | kg/m³ | Density of vapor component of gas mixture supplying drying process | $\dfrac{P_{v\_atm}}{R_v T_{atm}}$ |

TABLE 3-continued

Process Values

| Variable | Units | Description | Formula |
|---|---|---|---|
| $T_{dp\_atm}$ | °K. | Dewpoint of gas mixture supplying drying process | $240.7263 \left( \dfrac{7.591386}{\log\left(\dfrac{P_{g\_atm}}{\phi_{atm}}\right)} - 1 \right)^{-1}$ |
| $\dot{m}_{a\_atm}$ | kg/min | Mass flow rate of dry gas component of gas mixture supplying drying process | $\rho_{a\_atm} V_{atm}$ |
| $\dot{m}_{v\_atm}$ | kg/min | Mass flow rate of dry vapor component of gas mixture supplying drying process | $\rho_{v\_atm} V_{atm}$ |
| $H_{a\_atm}$ | J | Total enthalpy of dry gas component of gas mixture supplying drying process | $\dot{m}_{a\_atm} \times C_{pa\_atm} \times T_{celsius}$ |
| $H_{v\_atm}$ | J | Total enthalpy of vapor component of gas mixture supplying drying process | $\dot{m}_{v\_atm} \times C_{pv\_atm} \times T_{celsius}$ |
| $H_{total\_atm}$ | J | Total enthalpy of gas mixture supplying drying process | $H_{a\_atm} + Hv_{-atm}$ |
| $\dot{m}_{a\_inlet}$ | kg/min | Mass flow rate of dry air component of gas mixture supplying drying process. | Equal to $\dot{m}_{a\_atm}$ |
| $\dot{m}_{v\_inlet}$ | kg/min | Mass flow rate of vapor component of gas mixture supplying drying process. | Equal to $\dot{m}_{v\_atm}$ |
| $P_{inlet}$ | Pa | Pressure into drying chamber accounting for ambient and system pressure | $P_{atm} + 249.08891 \times P_{guage\_inlet}$ |
| $\omega_{inlet}$ | kg/kg | Specific humidity of gas mixture entering drying chamber | Equal to $\omega_{atm}$ |
| $\phi_{inlet}$ | % | Relative of gas mixture entering drying chamber, based on conservation of mass and humidity ratio in ambient air | $\dfrac{\omega_{inlet} \times P_{inlet}}{(0.622 + \omega_{inlet})P_{ws\_inlet}}$ |
| $\rho_{inlet}$ | kg/m³ | Density of gas mixture entering drying chamber | $\rho_{a\_inlet} + \rho_{v\_inlet}$ |
| $V_{inlet}$ | — | Calculated value used to interpolate saturation press of gas mixture into drying process | $1 - \dfrac{T_c}{T_{inlet}}$ |
| $P_{ws\_inlet}$ | Pa | Saturation press of gas mixture into drying process | $100 \times P_c \times e^{\frac{T_c}{T_{inlet}} \times I}$ where: $I = (C_1 v_{inlet} + C_2 v_{inlet}^{1.5} + C_3 v_{inlet}^3 + C_4 v_{inlet}^{3.5} + C_5 v_{inlet}^4 + C_6 v_{inlet}^{7.5})$ |
| $T_{celsius\_inlet}$ | °C. | Inlet temperature in Celsius | $T_{inlet} - 273$ |
| $C_{pa\_inlet}$ | J/kg° K. | Specific heat of dry gas component of gas mixture into drying process, interpolated from specific heat table of FIG. 5A | $(T_{celsius\_inlet}^3 \times (-5) \times 10^{-10} + T_{celsius\_inlet}^2 \times 6 \times 10^{-7} + T_{celsius\_inlet} \times 6 \times 10^{-6} + 1.0044)$ |
| $C_{pv\_inlet}$ | J/kg° K. | Specific heat of vapor component of gas mixture into drying process, interpolated from specific heat table of FIG. 5B | $(T_{celsius\_inlet}^3 \times (-1) \times 10^{-9} + T_{celsius\_inlet}^2 \times 10^{-6} + T_{celsius\_inlet} \times 2 \times 10^{-4} + 1.8584)$ |
| $P_{g\_inlet}$ | Pa | Partial pressure of gas mixture supplying drying process | $P_{ws\_inlet}$ |
| $P_{v\_inlet}$ | Pa | Partial pressure of vapor component of gas mixture supplying drying process | $\phi_{inlet} P_{ws\_inlet}$ |
| $P_{a\_inlet}$ | Pa | Partial pressure of dry air component of gas mixture supplying drying process | $P_{inlet} - P_{v\_inlet}$ |
| $\rho_{a\_inlet}$ | kg/m³ | Density of dry gas component of gas mixture into drying process | $\dfrac{P_{a\_inlet}}{R_g T_{inlet}}$ |

TABLE 3-continued

Process Values

| Variable | Units | Description | Formula |
|---|---|---|---|
| $\rho_{v\_inlet}$ | kg/m³ | Density of vapor component of gas mixture into drying process | $\dfrac{P_{v\_inlet}}{R_v T_{inlet}}$ |
| $T_{dp\_inlet}$ | °K. | Dewpoint of gas mixture into drying process | $240.7263\left(\dfrac{7.591386}{\log\left(\dfrac{P_{g\_inlet}}{\phi_{inlet}}\right)} - 1\right)^{-1}$ |
| $H_{a\_inlet}$ | J | Total enthalpy of dry gas component of gas mixture into drying process | $\dot{m}_{a\_inlet} \times C_{pa\_inlet} \times T_{celcius\_inlet}$ |
| $H_{v\_inlet}$ | J | Total enthalpy of vapor component of gas mixture into drying process | $\dot{m}_{v\_inlet} \times \omega_{inlet}(2501.3 + C_{pv\_inlet} \times T_{celcius})$ |
| $H_{total\_inlet}$ | J | Total enthalpy of gas mixture into drying process | $H_{a\_inlet} + H_{total\_inlet}$ |
| $V_{inlet}$ | m³/min | Calculated volumetric flow rate based on ambient air conditions | $\dot{m}_{a\_inlet}/\rho_{a\_inlet}$ |
| $\dot{m}_{a\_ex}$ | kg/min | Mass flow rate of dry air component of exhaust gas mixture | $\dot{m}_{a\_atm}$ |
| $\dot{m}_{v\_ex}$ | kg/min | Mass flow rate of vapor component of exhaust gas mixture | $\omega_{ex} \dot{m}_{a\_atm}$ |
| $\omega_{ex}$ | kg/kg | Specific humidity of exhaust gas mixture | $0.622\dfrac{\phi_{ex} \times P_{ws\_ex}}{P_{ex} - \phi_{ex} \times P_{ws\_ex}}$ |
| $\rho_{ex}$ | kg/m³ | Density of exhaust gas mixture | $\rho_{a\_ex} + \rho_{v\_ex}$ |
| $V_{ex}$ | m³/min | Volumetric flow of exhaust gas mixture | $\dot{m}_{a\_ex}/\rho_{a\_ex}$ |
| $v_{ex}$ | — | Calculated value used to interpolate saturation pressure of exhaust gas mixture | $T_{ex}/T_c$ |
| $P_{ws\_ex}$ | Pa | Saturation pressure of exhaust gas mixture | $100 \times P_c \times e^{\frac{T_c}{T_{ex}} \times I}$ <br> where: $I = (C_1 v_{ex} + C_2 v_{ex}^{1.5} + C_3 v_{ex}^3 + C_4 v_{ex}^{3.5} + C_5 v_{ex}^4 + C_6 v_{ex}^{7.5})$ |
| $T_{celsius\_ex}$ | °C. | Exhaust temperature in Celsius | $T_{ex} - 273$ |
| $C_{pa\_ex}$ | J/kg° K. | Specific heat of dry gas component of exhaust gas mixture, interpolated from specific heat table of FIG. 5A | $(T_{celsius\_ex}^3 \times (-5) \times 10^{-10} + T_{celsius\_ex}^2 \times 6 \times 10^{-7} + T_{celsius\_ex} \times 6 \times 10^{-6} + 1.0044)$ |
| $C_{pv\_ex}$ | J/kg° K. | Specific heat of vapor component of exhaust gas mixture, interpolated from specific heat table of FIG. 5B | $(T_{celsius\_ex}^3 \times (-1) \times 10^{-9} + T_{celsius\_ex}^2 \times 10^{-6} + T_{celsius\_ex} \times 2 \times 10^{-4} + 1.8584)$ |
| $P_{g\_ex}$ | Pa | Partial pressure of gas mixture supplying drying process | $P_{ws\_ex}$ |
| $P_{v\_ex}$ | Pa | Partial pressure of vapor component of gas mixture supplying drying process | $P_{ws\_ex}\phi_{ex}$ |
| $P_{a\_ex}$ | Pa | Partial pressure of dry air component of gas mixture supplying drying process | $P_{ex} - P_{v\_ex}$ |
| $\rho_{a\_ex}$ | kg/m³ | Density of dry gas component of exhaust gas mixture | $\dfrac{P_{a\_ex}}{R_g T_{ex}}$ |
| $\rho_{v\_ex}$ | kg/m³ | Density of vapor component of exhaust gas mixture | $\dfrac{P_{v\_ex}}{R_v T_{ex}}$ |
| $T_{dp\_ex}$ | °K. | Density of exhaust gas mixture | $240.7263\left(\dfrac{7.591386}{\log\left(\dfrac{P_{g\_ex}}{\phi_{ex}}\right)} - 1\right)^{-1}$ |
| $H_{a\_exhaust}$ | J | Total enthalpy of dry gas component of exhaust gas mixture | $\dot{m}_{a\_ex} \times C_{pa\_ex} \times T_{celcius\_ex}$ |

TABLE 3-continued

Process Values

| Variable | Units | Description | Formula |
|---|---|---|---|
| $H_{v\_exhaust}$ | J | Total enthalpy of vapor component of exhaust gas mixture | $\dot{m}_{v\_ex} \times \omega_{ex}(2501.3 + C_{pv\_ex} \times T_{celcius\_ex})$ |
| $H_{total\_exhaust}$ | J | Total enthalpy of exhaust gas mixture | $H_{a\_exhaust} + H_{v\_exhaust}$ |

Of particular interest is the calculation of the energy ratio, E %, which is detailed below.

$$E\% = \frac{Q_{applied}}{Q_{required}}$$

$Q_{applied}$ is the amount of energy used to dry the raw material, and $Q_{required}$ is the amount of energy that should theoretically be required to dry the raw material. In embodiments, $Q_{applied}$ can be determined the actual amount of energy E supplied by heat source over time. In other embodiments, $Q_{applied}$ can be calculated based on the ambient conditions, and compositions of the raw material 104, the finished material 112 and the exhaust gas 124. Simply put, $Q_{applied}$ is the total amount of energy used to change the raw material 104 to the finished material 112 and the drying gas 116 to the exhaust gas 124.

Figure 4:
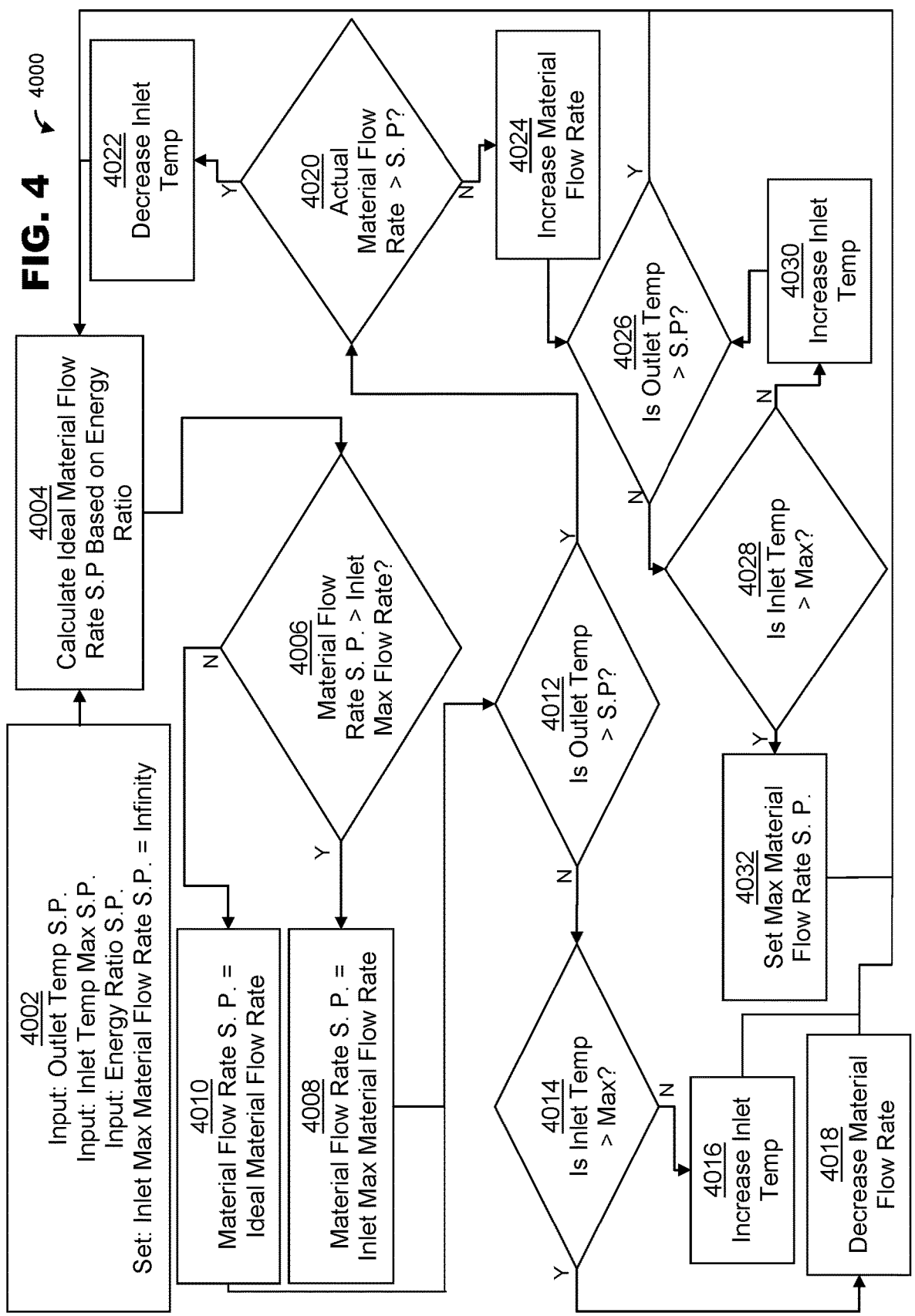
FIG. 4 is a method for controlling a dryer system, according to embodiments.

FIG. 4 is an energy balance diagram for an embodiment of dryer system 100 depicting an alternative formulation for determining the energy contained within each system input and output, from which it can be seen that, ignoring any loss, $E_{loss}$:

$$Q_{applied} = E_{exhaust} - E_{drying} + E_{finished} - E_{raw}$$

Therefore, when each component is separated based into its liquid and solid components:

$$Q_{applied} = E_{exhaust(dry)} - E_{drying(dry)} + E_{exhaust(vapor)} \\ - E_{drying(vapor)} + E_{finished(solids)} - E_{raw(solids)} \\ + E_{finished(liquid)} - E_{raw(liquid)}$$

Where the vapor component of the exhaust gas 124, $E_{exhaust(vapor)}$ will generally comprise both at least a portion of the vapor component of the drying gas 116, and the portion of the liquid in the raw material 104 that has been evaporated by the dryer system 100.

The amount of energy in each component can be calculated from the mass flow rate of the component and the enthalpy of the component. The enthalpy, H, of a fluid containing liquid and gaseous components with known specific heats and latent heat of vaporization can be calculated as:

$$H_{fluid} = C_{Pgas}T_{gas} + \omega(C_{Pliq}T_{liq} + h_l)$$

Therefore:

$$Q_{applied} = \dot{m}_{a\_atm}(C_{pa\_atm}T_{atm} - C_{pa\_ex}T_{ex}) + \dot{m}_{v\_atm} \\ (C_{pv\_atm}T_{atm} - C_{pv\_ex}T_{ex}) + V_{slurry}\rho_{slurry}(\% \text{ Solids}) \\ (C_{p\_solids}T_{raw}) - V_{slurry}\rho_{slurry}(\% \text{ Solids})C_{p\_solids} \\ T_{finished}) + V_{slurry}\rho_{slurry}(1-\% \text{ Solids})(C_{liquid}T_{raw}) \\ -[V_{slurry}\rho_{slurry}(1-\% \text{ Solids}) + \dot{m}_{v\_atm} - \dot{m}_{v\_ex}] \\ (C_{liquid}T_{finished})$$

In embodiments, the mass flow rate of either the materials 104 and 112 or the system gases 116 and 124 can be obtained by either measuring directly with a mass flow instrument, calculating using measured volumetric flow and known density, or estimated through the use of a mass balance approach. Direction measurement or calculation from volumetric flow and density can generally be more accurate as errors will be limited to accuracy of the measurement device and measurement or calculation of gas density. Estimation via through mass balance can be more cost effective can result in greater margins of error as assumptions about system response such as mass transfer efficiency can be required.

In embodiments, a condensation factor can also be considered, where the drying gas 116 approaches its saturation point.

$Q_{required}$ can be calculated based on the composition of the raw material 104, as follows:

$$Q_{required} = [V_{slurry}\rho_{slurry} - V_{slurry}\rho_{slurry}(\% \text{ Solids})]C_{liquid} \\ (T_{boiling} - T_{raw}) + [V_{slurry}\rho_{slurry} - V_{slurry}\rho_{slurry}(\% \\ \text{Solids})]h_l$$

In embodiments, $Q_{required}$ can incorporate the effect of a system loss constant, which can be measured by running drying system 100 with no load or calculated based on the design of drying system 100.

While the energy ratio calculations described above incorporate specific sensed and input values, such as the temperature of the air provided to the dryer, those of ordinary skill in the art will recognize that the energy ratio can be generalized to other drying environments, such as sheet dryers. In particular, the energy ratio can be calculated from any set of values that provide an indication of the amount of energy applied to the raw material to produce the finished goods, an indication of the moisture content of the finished goods, and indications of the ambient environmental conditions.

FIG. 4 is a flowchart depicting an embodiment of a method 4000 that can be executed by control system 300 in order to meet a desired outlet temperature, $T_{ex}$, and energy ratio, E %, by modulating the raw material flow rate, $V_{slurry}$, setpoint, and the drying gas inlet temperature $T_{inlet}$.

At 4002, the desired outlet temperature, energy ratio, and maximum inlet temperature are received. In embodiments, the maximum raw material flow rate can be assumed to be infinite. In embodiments, process constants such as those listed in Table 2 can also be received during this task. In embodiments, process constants can be received prior to execution of method 4000.

At 4004, the desired energy ratio is used to calculate an ideal setpoint for the raw material flow rate by solving the energy ratio equation for $V_{slurry}$. At 4006, the ideal raw material flow rate setpoint is compared to the maximum raw material flow rate for the system. The raw material flow rate setpoint is set to the greater of the ideal setpoint 4008, or the maximum raw material flow rate at 4010 accordingly.

At 4012, the measured outlet temperature is compared to the setpoint. If the measured outlet temperature is less the setpoint, it can be desirable to increase the inlet temperature, if possible, to avoid lowering the yield of the system.

Therefore, the inlet temperature is compared to the maximum inlet temperature at 4014. The inlet temperature will be increased if possible at 4016, but if the inlet temperature is greater than the maximum temperature, the material flow rate setpoint is decreased at 4018.

If, at 4012, the measured outlet temperature is greater than the setpoint, it can be desirable to increase the raw material flow rate setpoint in order to increase the yield of the system. Therefore, at 4020, the measured volumetric flow rate is compared to the material flow rate setpoint determined in 4008 or 4010. If the measured volumetric flow rate is greater than the setpoint, the inlet temperature is decreased at 4022. If the measured volumetric flow rate is less than or equal to the setpoint, then the material flow rate is increased at 4024.

In embodiments, method 4000 can enable the determination of a maximum material flow rate. At 4026, if the measured outlet temperature is greater than the desired outlet temperature setpoint, control flow can return to 4004 to calculate a new ideal volumetric flow rate. If the outlet temperature is less than the desired outlet temperature setpoint, the system can attempt to modulate inlet temperature and/or determine that the current material flow rate is the maximum material flow rate supported by the system at this time.

At 4028, the current inlet temperature is compared to the maximum inlet temperature. If the inlet temperature can be increased, it is at 4030. Control flow then returns to 4026 to determine if the desired outlet temperature has been reached. If not, at 4032, a new maximum material flow rate is set based on the current material flow rate, and control flow is returned to 4004 for determination of a new material flow rate setpoint. In embodiments, the new maximum flow rate can be set equal to the current material flow rate. In embodiments, the new maximum material flow rate can be set somewhat below the current material flow rate.

In embodiments, control system 300 can present information regarding execution of method 4000 to the user. As will be appreciated by those of ordinary skill in the art, execution of method 4000 can result in undesired behavior if conditions prevent the achievement of the desired outlet temperature given the other system constraints. For example, if the maximum inlet temperature, ratio of solids to liquid in the raw material, or the raw material temperature are too low, the desired outlet temperature may not be reached, even if the raw material flow rate setpoint is set to zero. Control system 300 can provide error, alert, alarm, or other messages to the user to indicate that such a condition is present, or is imminent.

Execution of method 4000, or other control methods by control system 300 can be continuous during the operation of drying system 100. The various tasks of method 3000 can be executed in immediate succession, in embodiments, or control system 300 can delay after any change in setpoint in order to allow the system to react, prior to measuring. Those of ordinary skill in the art will appreciate that method 4000 is merely an example of a control method supportable by control system 300, and that other combinations of inputs, setpoints, and modulated outputs can be provided. For example, inlet air temperature represents the amount of heat energy being applied by the dryer. For other forms of drying systems that do not involve heating the inlet air, inlet air temperature can be replaced with the corresponding heat input as appropriate.

In the embodiment of method 4000 described above the energy ratio, is provided as an input. In embodiments, control system 300 can present additional methods for determining a target energy ratio based on system performance in terms of material yield, utility usage, or other performance metrics. In embodiments, control system 300 can monitor the results of changes to control variables (such as the actual effect that an increase in inlet air temperature has on exhaust air temperature) and automatically adjust process variables such as the system loss constant. In embodiments, this automatic adjustment can be performed using machine-learning, or other optimization methods known in the art. In practice, operators may choose to attempt to minimize the energy ratio (to ensure that the energy use is kept at a minimum while maintaining a desired yield). Operators may choose at other times to attempt to maximize the energy ratio in order to maximize material yield.

In embodiments, establishment of the inlet air temperature set value is independent of inlet air moisture content. The inlet air temperature setpoint can therefore be entirely driven by product characteristics. The inlet air temperature setpoint is set at the maximum value allowed by the product being processed without compromising product quality. Once established, the inlet air temperature is held fixed at the maximum value permitted based on the product being processed. This approach can maximize both energy transfer and process capacity. In other words, inlet air temperature need not be regulated. The inlet air temperature can be established during a baseline, or prior to system startup and fixed at the maximum value permitted by the product being processed without sacrificing product quality. In other words, the inlet air temperature (the amount of heat energy applied) does not need to be adjusted provided the indication of moisture content in the finished material (described as the exhaust air temperature above) is acceptable.

Material yield provides insight to the performance and operational cost of the processing equipment. A real-time material yield can be calculated by solids content, density, flow of raw material, and weight of finished product over a known period of time in embodiments. Control system 300 can provide real-time comparison of cumulative slurry solids, % Solids×$\dot{m}_{slurry}$, to cumulative finished product, $\dot{m}_{finished}$, per unit time enabling real-time calculation of material yield in embodiments. The calculated real-time material yield can enable the operator of control system 300 to make in-flight adjustments to constraints and setpoints in order to optimize the total processing cost. For example, in embodiments, control system 300 can enable adjustment of the target energy ratio in an effort to optimize material yield. In embodiments, methods of control system 300 can determine an energy ratio that prioritizes yield optimization.

Utility consumption is another aspect of the drying process that is a significant factor in determining the performance of the process and total operational cost of drying system 100. By monitoring the consumption of the energy supplying resource, for example the electricity or combustible fuel supplying heat source 120, and the weight of finished goods produced over a known period of time, $\dot{m}_{finished}$/time, the real-time utility consumption per unit of finished goods can be determined. Real-time utility consumption per unit of finished goods produced further enhances operator ability to make in-flight adjustments to process variables to optimize total processing cost. In embodiments, control system 300 can enable adjustment of the target energy ratio in an effort to optimize utility consumption per unit of finished goods. In embodiments, methods of control system 300 can determine an energy ratio that prioritizes utility consumption per unit optimization.

In embodiments, control system 300 can optimize for system performance variables such as material yield or energy consumption by determining an energy ratio that achieves one or more performance variable goals, and providing that energy ratio as input to method 4000, or other methods of control system 300. Performance variable goals can be received as input from an operator of control system 300, determined by monitoring performance of dryer system 100, and/or by modulating constraints and setpoints in order to achieve the maximum (or minimum) system performance for one or more variables. In embodiments, the energy ratio can be adjusted over time as system performance or ambient conditions change.

Embodiments of the present disclosure can compensate for environmental factors such as ambient pressure and temperature changes caused by storm fronts, seasonal fluctuations, daily temperature or other fluctuations, and changes in the effects of heating, ventilation, and air-conditioning (HVAC) system on the ambient environment.

Embodiments of the present disclosure can further compensate for processing factors. For example, embodiments can compensate for changes in raw material viscosity, pump loss, solids content, density, or flow rate. Similarly, embodiments can compensate for variations in the output of heat source, and variations in airflow or density of supply gas.

Embodiments of the present disclosure can enable minimization of consumption of heat source fuel, minimization of energy used by fans and pumps, and maximization of finished product yield. Further, embodiments can enable more efficient production scheduling by allowing anticipation of run conditions, providing better visibility of the costs of the production process, and improved temperature control for sensitive products.

In embodiments, control system 300 and/or its components or subsystems can include computing devices, microprocessors, modules and other computer or computing devices, which can be any programmable device that accepts digital data as input, is configured to process the input according to instructions or algorithms, and provides results as outputs. In an embodiment, computing and other such devices discussed herein can be, comprise, contain or be coupled to a central processing unit (CPU) configured to carry out the instructions of a computer program. Computing and other such devices discussed herein are therefore configured to perform basic arithmetical, logical, and input/output operations.

Computing and other devices discussed herein can include memory. Memory can comprise volatile or non-volatile memory as required by the coupled computing device or processor to not only provide space to execute the instructions or algorithms, but to provide the space to store the instructions themselves. In embodiments, volatile memory can include random access memory (RAM), dynamic random access memory (DRAM), or static random access memory (SRAM), for example. In embodiments, non-volatile memory can include read-only memory, flash memory, ferroelectric RAM, hard disk, floppy disk, magnetic tape, or optical disc storage, for example. The foregoing lists in no way limit the type of memory that can be used, as these embodiments are given only by way of example and are not intended to limit the scope of the disclosure.

In embodiments, the system or components thereof can comprise or include various modules or engines, each of which is constructed, programmed, configured, or otherwise adapted to autonomously carry out a function or set of functions. The term "engine" as used herein is defined as a real-world device, component, or arrangement of components implemented using hardware, such as by an application specific integrated circuit (ASIC) or field-10 programmable gate array (FPGA), for example, or as a combination of hardware and software, such as by a microprocessor system and a set of program instructions that adapt the engine to implement the particular functionality, which (while being executed) transform the microprocessor system into a special-purpose device. An engine can also be implemented as a combination of the two, with certain functions facilitated by hardware alone, and other functions facilitated by a combination of hardware and software. In certain implementations, at least a portion, and in some cases, all, of an engine can be executed on the processor(s) of one or more computing platforms that are made up of hardware (e.g., one or more processors, data storage devices such as memory or drive storage, input/output facilities such as network interface devices, video devices, keyboard, mouse or touchscreen devices, etc.) that execute an operating system, system programs, and application programs, while also implementing the engine using multitasking, multithreading, distributed (e.g., cluster, peer-peer, cloud, etc.) processing where appropriate, or other such techniques. Accordingly, each engine can be realized in a variety of physically realizable configurations, and should generally not be limited to any particular implementation exemplified herein, unless such limitations are expressly called out. In addition, an engine can itself be composed of more than one sub-engines, each of which can be regarded as an engine in its own right. Moreover, in the embodiments described herein, each of the various engines corresponds to a defined autonomous functionality; however, it should be understood that in other contemplated embodiments, each functionality can be distributed to more than one engine. Likewise, in other contemplated embodiments, multiple defined functionalities may be implemented by a single engine that performs those multiple functions, possibly alongside other functions, or distributed differently among a set of engines than specifically illustrated in the examples herein.

Various embodiments of systems, devices, and methods have been described herein. These embodiments are given only by way of example and are not intended to limit the scope of the claimed inventions. It should be appreciated, moreover, that the various features of the embodiments that have been described may be combined in various ways to produce numerous additional embodiments. Moreover, while various materials, dimensions, shapes, configurations and locations, etc. have been described for use with disclosed embodiments, others besides those disclosed may be utilized without exceeding the scope of the claimed inventions.

Persons of ordinary skill in the relevant arts will recognize that the subject matter hereof may comprise fewer features than illustrated in any individual embodiment described above. The embodiments described herein are not meant to be an exhaustive presentation of the ways in which the various features of the subject matter hereof may be combined. Accordingly, the embodiments are not mutually exclusive combinations of features; rather, the various embodiments can comprise a combination of different individual features selected from different individual embodiments, as understood by persons of ordinary skill in the art. Moreover, elements described with respect to one embodiment can be implemented in other embodiments even when not described in such embodiments unless otherwise noted.

Although a dependent claim may refer in the claims to a specific combination with one or more other claims, other embodiments can also include a combination of the dependent claim with the subject matter of each other dependent claim or a combination of one or more features with other dependent or independent claims. Such combinations are proposed herein unless it is stated that a specific combination is not intended.

Any incorporation by reference of documents above is limited such that no subject matter is incorporated that is contrary to the explicit disclosure herein. Any incorporation by reference of documents above is further limited such that no claims included in the documents are incorporated by reference herein. Any incorporation by reference of documents above is yet further limited such that any definitions provided in the documents are not incorporated by reference herein unless expressly included herein.

For purposes of interpreting the claims, it is expressly intended that the provisions of 35 U.S.C. § 112(f) are not to be invoked unless the specific terms "means for" or "step for" are recited in a claim.

What is claimed is:

1. A control system for an apparatus for drying a raw material to produce a finished material with a reduced moisture content, the apparatus for drying comprising a raw material supply, a heat source, and a plurality of sensors including at least one ambient condition sensor and at least one sensor providing an indication of the moisture content of the finished material, the control system comprising:
   a sensor input module configured to receive a measurement from each sensor of the plurality of sensors;
   a configuration interface configured to receive input of a desired moisture content of the finished material and a desired energy ratio, the energy ratio defined by the ratio between the actual energy to be applied to the raw material and the theoretical energy required to achieve the desired moisture content of the finished material;
   a calculation module configured to determine an ideal raw material supply rate and an ideal amount of heat energy to apply based on the desired moisture content of the finished material, the desired energy ratio, and the input from the at least one ambient condition sensor; and
   an output interface configured to provide an output comprising the ideal raw material supply rate and the ideal amount of heat energy to apply for controlling the apparatus for drying.

2. The control system of claim 1, wherein the ideal raw material supply rate and the ideal amount of heat energy to apply are determined by:
   calculating an initial raw material supply rate based on the energy ratio and the input from the at least one ambient condition sensor;
   monitoring the indication of moisture content of the finished material;
   reducing the raw material supply rate if the indication of moisture content of the finished material is higher than the desired moisture content of the finished material and the amount of heat energy being applied is greater than or equal to a maximum amount of heat energy to apply;
   increasing the amount of heat energy to apply if the indication of moisture content of the finished material is higher than the desired moisture content of the finished material and the amount of heat energy being applied is less than or equal a maximum amount of heat energy to apply;
   increasing the raw material supply rate if the indication of moisture content of the finished material is less than the desired moisture content of the finished material and the raw material supply rate is less than a maximum raw material supply rate; and
   decreasing the amount of heat energy to apply if the indication of moisture content of the finished material is lower than the desired moisture content of the finished material and the raw material supply rate is greater than or equal to a maximum raw material supply rate.

3. The control system of claim 1, wherein the ideal amount of heat energy to apply is output as one of: a temperature setpoint or a power level for the heat source.

4. The control system of claim 1, wherein the at least one ambient condition sensor comprises at least one of: a temperature sensor and a moisture sensor.

5. The control system of claim 1, wherein the indication of moisture content of the finished material is one of: a density of the finished material, temperature of the finished material, an exhaust air temperature, a moisture content of the finished material, or a combination thereof.

6. The control system of claim 1, wherein the configuration interface is one of: a user interface or a programmatic interface.

7. The control system of claim 1, wherein the output interface one of: a user interface or a programmatic interface.

8. The control system of claim 1, wherein the output interface is operably coupled to a control subsystem, such that the output of the calculated ideal raw material supply rate and calculated amount of heat energy are provided as setpoints to the control subsystem.

9. The control system of claim 1, wherein the calculation of the energy ratio includes a system loss constant.

10. The control system of claim 1, wherein the output interface further provides an output of a calculated processing cost per unit of finished material.

11. A method of controlling an apparatus for drying a raw material to produce a finished material with a reduced moisture content, the apparatus for drying comprising a raw material supply, a heat source, and a plurality of sensors including at least one ambient condition sensor and at least one sensor providing an indication of the moisture content of the finished material, the method comprising:
   receiving a measurement from each sensor of the plurality of sensors;
   receiving input defining a desired the moisture content of the finished material and a desired energy ratio, the energy ratio defined by the ratio between the actual energy to be applied to the raw material and the theoretical energy required to achieve the desired moisture content of the finished material;
   determining an ideal raw material supply rate and an ideal amount of heat energy to apply based on the desired moisture content of the finished material, the desired energy ratio, and an input from the at least one ambient condition sensor; and
   drying the raw material to produce the finished material by controlling the heat source to apply the ideal amount of heat energy and controlling the raw material supply to supply raw material at the ideal material supply rate.

12. The method of claim 11, wherein the ideal raw material supply rate and the ideal amount of heat energy to apply are determined by:
   calculating an initial raw material supply rate based on the energy ratio and the input from the at least one ambient condition sensor;
   monitoring the indication of moisture content of the finished material;
   reducing the raw material supply rate if the indication of moisture content of the finished material is higher than the desired moisture content of the finished material and the amount of heat energy being applied is greater than or equal to a maximum amount of heat energy to apply;

increasing the amount of heat energy to apply if the indication of moisture content of the finished material is higher than the desired moisture content of the finished material and the amount of heat energy being applied is less than or equal a maximum amount of heat energy to apply;

increasing the raw material supply rate if the indication of moisture content of the finished material is less than the desired moisture content of the finished material and the raw material supply rate is less than a maximum raw material supply rate; and decreasing the amount of heat energy to apply if the indication of moisture content of the finished material is lower than the desired moisture content of the finished material and the raw material supply rate is greater than or equal to a maximum raw material supply rate.

13. A method of controlling an apparatus for drying a raw material to produce a finished material with a reduced moisture content, the apparatus for drying comprising a raw material supply, a heat source, and a plurality of sensors including at least one ambient condition sensor and at least one sensor providing an indication of the moisture content of the finished material, the method comprising:

receiving a measurement from each sensor of the plurality of sensors;

receiving an input defining a desired moisture content of the finished material, and a desired energy ratio, the energy ratio defined by the ratio between the actual energy to be applied to the raw material and the theoretical energy required to achieve the desired moisture content of the finished material;

calculating an initial raw material supply rate based on the energy ratio and the input from the at least one ambient condition sensor;

determining an ideal raw material supply rate and an ideal amount of heat energy to apply based on the desired moisture content of the finished material, the desired energy ratio, and the input from the at least one ambient condition sensor; and providing an output to the apparatus for drying of the calculated ideal raw material supply rate and the calculated ideal amount of heat energy to apply.

14. The method of claim 13, wherein the ideal amount of heat energy to apply is output as one of: a temperature setpoint or a power level for the heat source.

15. The method of claim 13, wherein the at least one ambient condition sensor comprises at least one of: a temperature sensor and a moisture sensor.

16. The method of claim 13, wherein the indication of moisture content of the finished material is one of: a density of the finished material, temperature of the finished material, an exhaust air temperature, a moisture content of the finished material, or a combination thereof.

17. The method of claim 13, wherein the output is provided to a control subsystem, such that the output of the calculated ideal raw material supply rate and calculated ideal amount of heat energy to apply are provided as setpoints to the control subsystem.

18. The method of claim 13, wherein the calculation of the energy ratio includes a system loss constant.

19. The method of claim 13, further comprising providing an output of a calculated processing cost per unit of finished material.

* * * * *